K. K. CLARKE.
VARIABLE SPEED GEARING.
APPLICATION FILED NOV. 26, 1919.
1,354,956.
Patented Oct. 5, 1920.
2 SHEETS—SHEET 1.
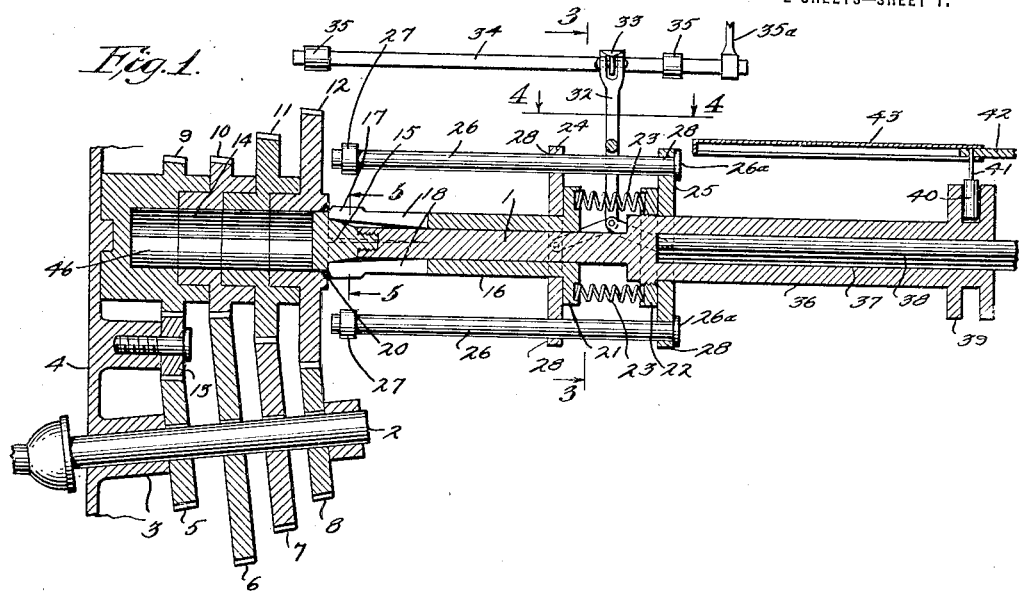
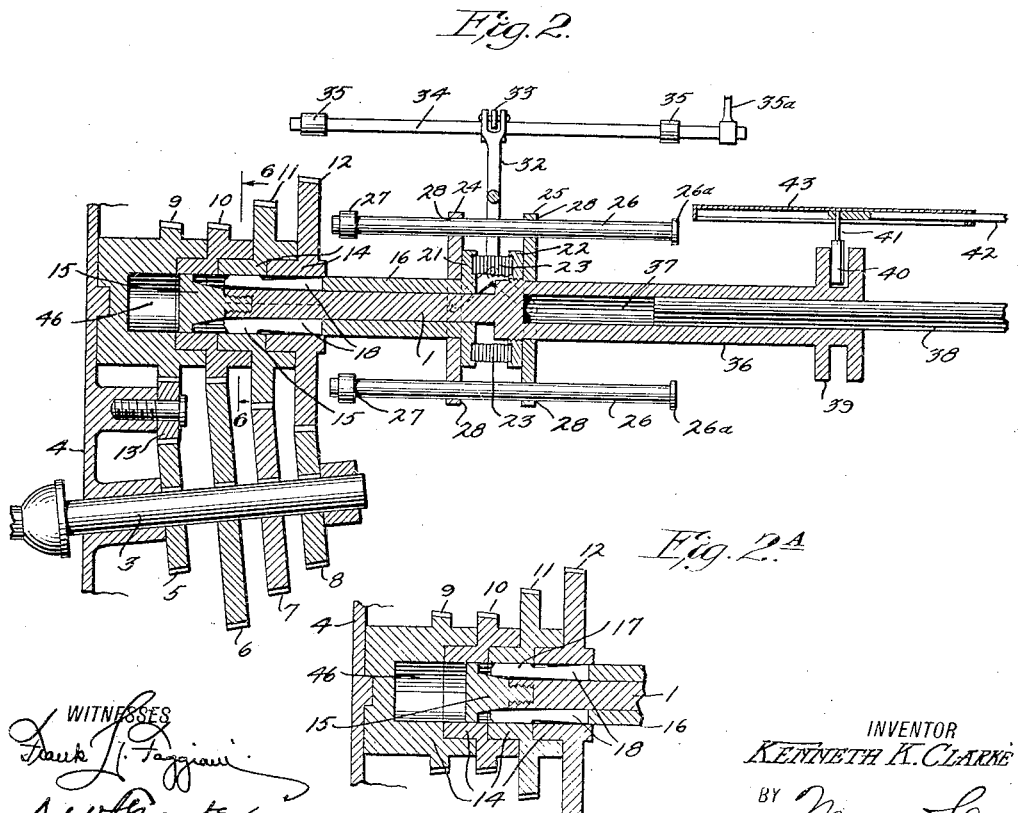
INVENTOR
KENNETH K. CLARKE
BY Munn & Co
ATTORNEYS K. K. CLARKE.
VARIABLE SPEED GEARING.
APPLICATION FILED NOV. 26, 1919.
1,354,956.
Patented Oct. 5, 1920.
2 SHEETS—SHEET 2.
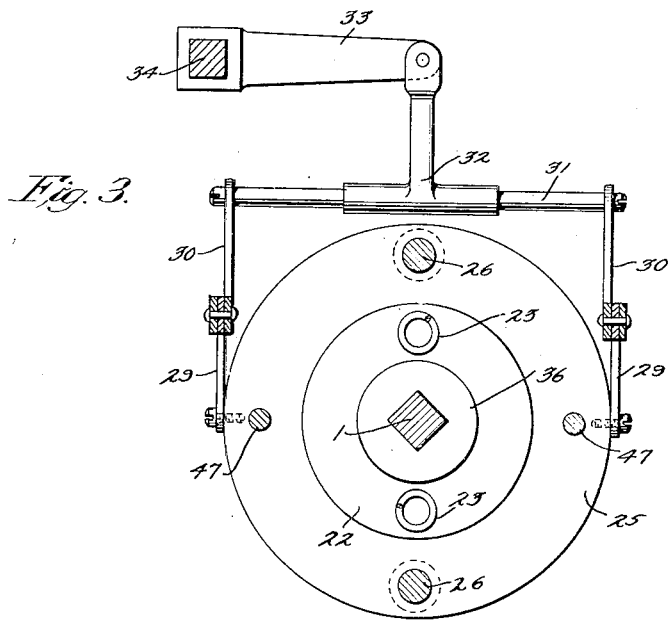
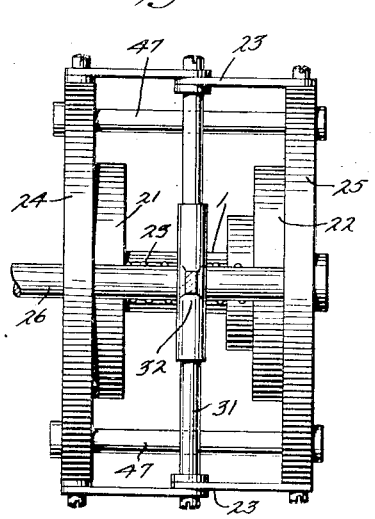
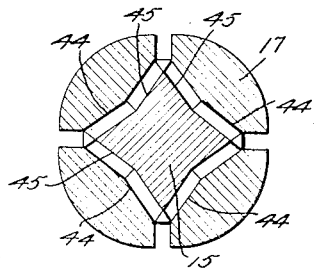
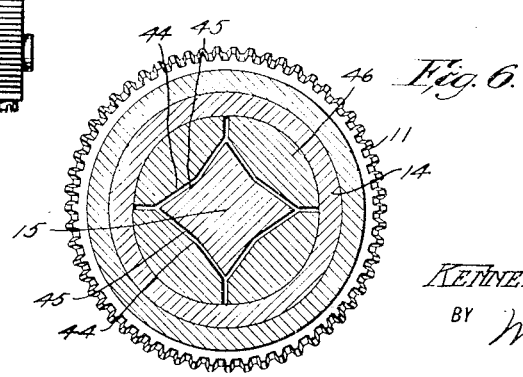
INVENTOR
KENNETH K. CLARKE.
BY
ATTORNEYS

UNITED STATES PATENT OFFICE.

KENNETH K. CLARKE, OF NEW YORK, N. Y.

VARIABLE-SPEED GEARING.

1,354,956. Specification of Letters Patent. Patented Oct. 5, 1920.

Application filed November 26, 1919. Serial No. 340,780.

*To all whom it may concern:*

Be it known that I, KENNETH K. CLARKE, a citizen of the United States, and a resident of the city of New York, borough of Manhattan, in the county of New York and State of New York, have invented a new and Improved Variable-Speed Gearing, of which the following is a full, clear, and exact description.

This invention relates to improvements in variable speed gearing, an object of the invention being to provide a gear transmission in which the driving and driven gears are always in mesh, and provide improved means for connecting any of the driving gears with the driving shaft.

A further object is to provide improved means for coupling the drive shaft with any one of the driving gears or position the drive shaft so that it turns idly when not transmitting motion to the gears.

With these and other objects in view the invention consists in certain novel features of construction, and combinations and arrangements of parts, as will be more fully hereinafter described and pointed out in the claims.

In the accompanying drawings—

Figure 1 is a view in longitudinal section showing the drive shaft in idle position;

Fig. 2 is a similar view showing the drive shaft moved into the drive gears;

Fig. 2$^A$ is a detail view showing the position of parts when the drive shaft is clutched to one of the gears;

Fig. 3 is an enlarged view in section on the line 3—3 of Fig. 1;

Fig. 4 is an enlarged view in section on the line 4—4 of Fig. 1;

Fig. 5 is a view in transverse section through the expansible head of the drive shaft with the parts in full expanded position; and Fig. 6 is an enlarged view in section on the line 6—6 of Fig. 2.

1 represents a drive shaft and 2 a driven shaft. These shafts are shown at an angle to each other, but it is obvious that they may be parallel or in any other angular relation to each other. The driven shaft 2 is mounted in a bearing 3 on any suitable support 4 and has fixed thereto a series of gear wheels 5, 6, 7 and 8 respectively.

A series of nested drive gears 9, 10, 11 and 12 are located adjacent the first-mentioned gears, and gears 10, 11 and 12 are always in mesh with gears 6, 7 and 8 respectively. An idle gear 13 connects the gears 9 and 5 so that this train of gears constitutes a reversing gearing. The other gears are of varying sizes so as to vary the speed of transmission as will be readily understood.

The driving gears 9, 10, 11 and 12 are each provided with alined hubs 14 so that a continuous bore 46 is provided for the reception of the clutching means, as will now be described.

A spreader 15 is fixed to the end of drive shaft 1 and is movable in the longitudinal bore 46. The drive shaft 1 is preferably angular in cross-section and a sliding sleeve 16 fits the shaft 1 and is mounted to move longitudinally thereon. This sleeve 16 is provided at one end with an expansible head 17, the head being rendered expansible by providing longitudinal slots 18 in the end of the sleeve so that when the spreader 15 is moved into the head, it serves to expand the same as will more fully hereinafter appear.

The end of the sleeve 16 and the hub 14 of the gear 12 are provided with beveled contacting faces 20 so as to facilitate the entrance of the head into the hub. The sleeve 16 at its end is made with an annular flange 21 and a similar flange 22 is provided on the drive shaft 1 by positioning a removable screw threaded ring thereon, and coiled springs 23 are interposed between the flanges 21 and 22 tending to force them apart. Disks 24 and 25 are fitted on the sleeve 16 and shaft 1 respectively against the flanges 21 and 22, and these disks have openings 28 receiving rods 26 which guide the movement of the disks, and suitable bearing brackets 27 are provided supporting the rods 26 at one end. These rods 26 have enlarged ends 26$^a$ which limit the movement of the disk 25 in one direction, and headed pins 47 extend through the disks and limit their separation, as clearly shown in Fig. 4.

Toggle levers 29 connect the disks 24 and 25 at opposite sides and these toggle levers 29 are connected by links 30 with a transverse rod 31. An inverted T 32 is fixed to the center of the rod 31 and at its upper end is pivotally connected to a crank arm 33. This crank arm 33 is keyed to slide upon an angular crank shaft 34, the latter mounted in suitable bearings 35 and having an operating lever 35ª which may be connected to or constitute the clutch pedal of the gear shifting mechanism.

The drive shaft 1 at one end is enlarged and constitutes a sleeve 36 having an angular bore 37 telescoping upon an angular shaft extension 38 so as to permit longitudinal movement of the drive shaft relative to its driving means, as will be understood. A grooved head 39 is formed on the sleeve 36 and is engaged by a roller 40 on an arm 41 carried by an operating rod 42, and this operating rod is controlled in its longitudinal movement by a guide bar 43. The rod 42 is connected to any approved form of gear shifting lever, not shown.

Referring particularly to Figs. 1, 2, 3, 5 and 6, it will be noted that the expansible head 17 is formed internally with longitudinally beveled faces 44 which engage correspondingly beveled faces 45 of the spreader 15, so that the movement of these parts longitudinally in opposite directions toward each other causes the head to expand and the reverse movement permits the head to contract. When the head is contracted, its periphery is a perfect circle, but when it is expanded, the circular lines of the periphery are distorted, and I would have it particularly understood that the bore 46 constituting the interior of the hubs 14 has a shape in cross-section corresponding to the shape of the head when distended so as to effectually clutch a drive gear with the distended head, and when the head is contracted, it can move freely through the gear.

The operation is as follows: Assuming the parts to be in the idle position shown in Fig. 1, it is first necessary to turn the shaft 34 by means of the clutch pedal above referred to, so as to exert an upward pull on the toggle levers 29, thus drawing the disks 24 and 25 toward each other and compressing the springs. This movement of the disks toward each other causes the spreader 15 to be moved away from the expansible head, the parts being in the relative position shown in Fig. 2. While in this position the rod 42 is operated by means of the clutch lever, above referred to, to move the drive shaft longitudinally to the left of Fig. 1, or, in other words, to bring the parts to the position shown in Fig. 2.

The clutch lever is then released so that the springs 23 force the disks 24 and 25 apart, thereby drawing the spreader 15 into the expansible head 17 to expand the latter and grip the gear 11, as shown clearly in Fig. 2ᴬ. It is, of course, to be understood that these parts may be moved so as to grip any of the gears 9, 10, 11 or 12 so that the transmission may be at the desired speed or reversed.

It will thus be noted that with my improved mechanism the expansible head 17 may be moved into engagement with any one of the gears and shifted from one position to the other without any disengagement of the gears, and hence, avoid the possibility of stripping the gears and the noise incident to the changing of gears with devices in ordinary use on the market.

Various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A variable speed gearing, comprising a series of drive gears, a series of driven gears meshing with the drive gears, said drive gears having alined hubs, a drive shaft movable into the hubs of the drive gears, an expansible head on the drive shaft, and a spreader on the drive shaft movable longitudinally relative to the head to expand the head in any of the gear hubs and lock any of the hubs to the drive shaft.

2. A variable speed gearing, comprising a series of driven gears, a series of drive gears meshing with the driven gears and having alined hubs, a longitudinally movable drive shaft movable in the hubs, a spreader on the end of the drive shaft, a sleeve on the drive shaft, an expansible head on the sleeve, and means moving the sleeve and shaft relative to each other to expand or contract the head.

3. A variable speed gearing, comprising a series of driven gears, a series of drive gears meshing with the driven gears and having alined hubs, a longitudinally movable drive shaft movable in the hubs, a spreader on the end of the drive shaft, a sleeve on the drive shaft, said sleeve having longitudinal slots in one end, the sections between the slots constituting an expansible head, springs tending to force the sleeve and shaft in opposite directions to move the spreader in the head to expand the same, means for moving the disks toward each other, and means for moving the shaft longitudinally.

4. A variable speed gearing, comprising a series of driven gears, a series of drive gears meshing with the driven gears and having alined hubs, a longitudinally movable drive shaft movable in the hubs, a spreader on the end of the drive shaft, a sleeve on the drive shaft, an expansible head on the sleeve operated by the spreader, disks on the sleeve and the shaft, springs between the disks tending to force the spreader into the head, toggle levers connecting the disks, means operating the toggle levers for drawing the disks toward each other, and means for moving the shaft longitudinally.

5. A variable speed gearing, comprising a series of driven gears, a series of drive gears meshing with the driven gears and having alined hubs, a longitudinally movable drive shaft movable in the hubs, a spreader on the end of the drive shaft, a sleeve on the drive shaft, an expansible head on the sleeve operated by the spreader, disks on the sleeve and the shaft, springs between the disks tending to force the spreader into the head, toggle levers connecting the disks, means operating the toggle levers for drawing the disks toward each other, said shaft having a sleeve at one end, a shaft section telescoping in the sleeve and keyed to turn therewith, a grooved head on the sleeve, a roller in the grooved head, an arm supporting the roller, a rod carrying the arm, and a guide controlling the movement of the rod.

6. A variable speed transmission, comprising a series of driven gears, a series of drive gears meshing with the driven gears, said drive gears having registering hubs, a drive shaft movable into the hubs, an expansible head on the drive shaft, a spreader on the drive shaft for moving the head, said head when expanded having the same peripheral contour as the interior of the hubs, means for moving the shaft relative to the spreader, and means for moving the spreader and the shaft simultaneously in the same direction.

7. A variable speed gearing, comprising a series of driven gears, a series of drive gears meshing with the driven gears and having alined hubs, a drive shaft, a sleeve on the drive shaft, an expansible head on the sleeve, a spreader on the drive shaft, disks on the sleeve and the shaft, rods guiding the movement of the disks, springs interposed between the disks, toggle levers connecting the disks, an operating crank shaft, a crank arm keyed to slide on the crank shaft, an inverted T head pivotally connected to the arm, a rod carried by the T head, links pivotally connecting the rod with the toggle levers, means for turning the crank shaft, and means for moving the drive shaft longitudinally.

KENNETH K. CLARKE.